United States Patent Office 3,592,925
Patented July 13, 1971

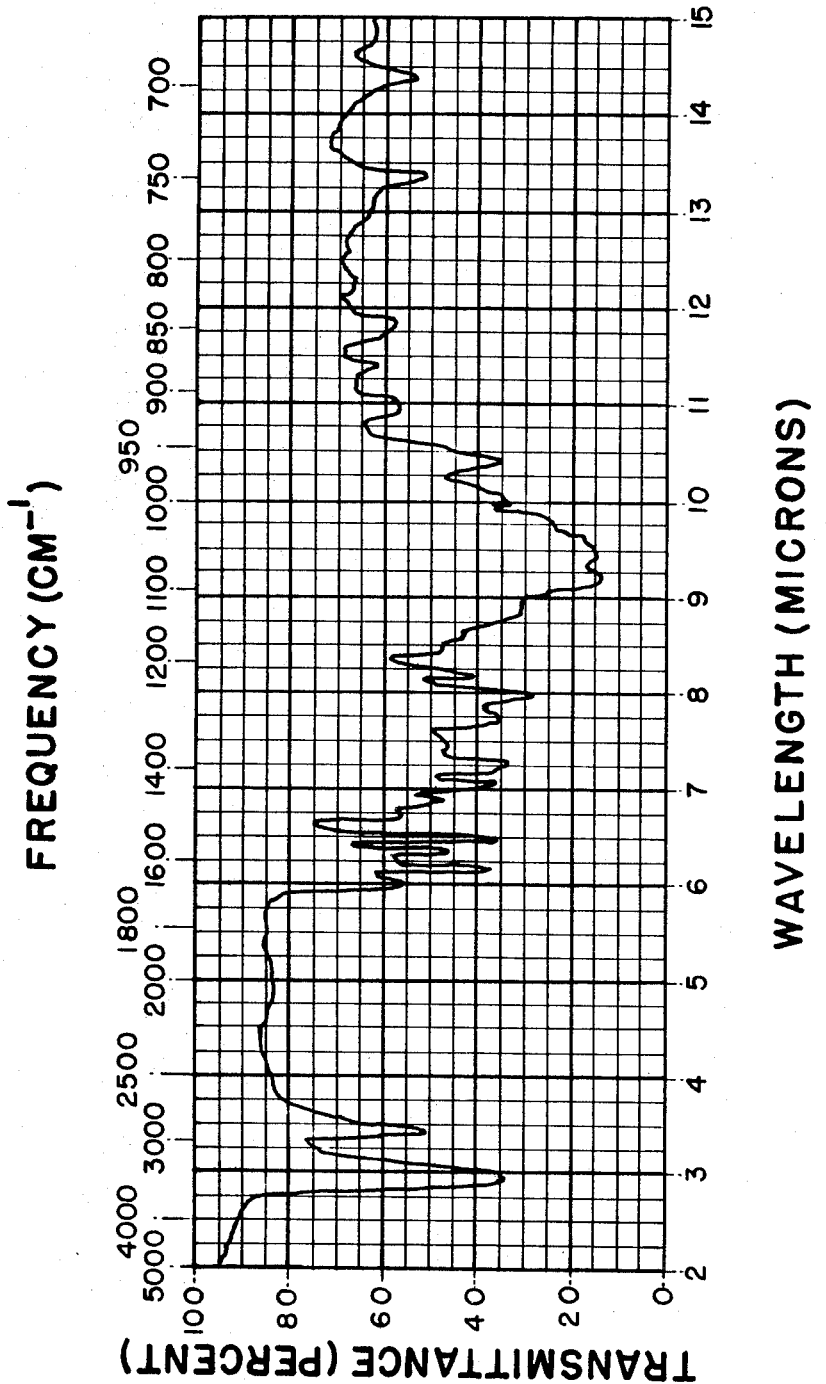

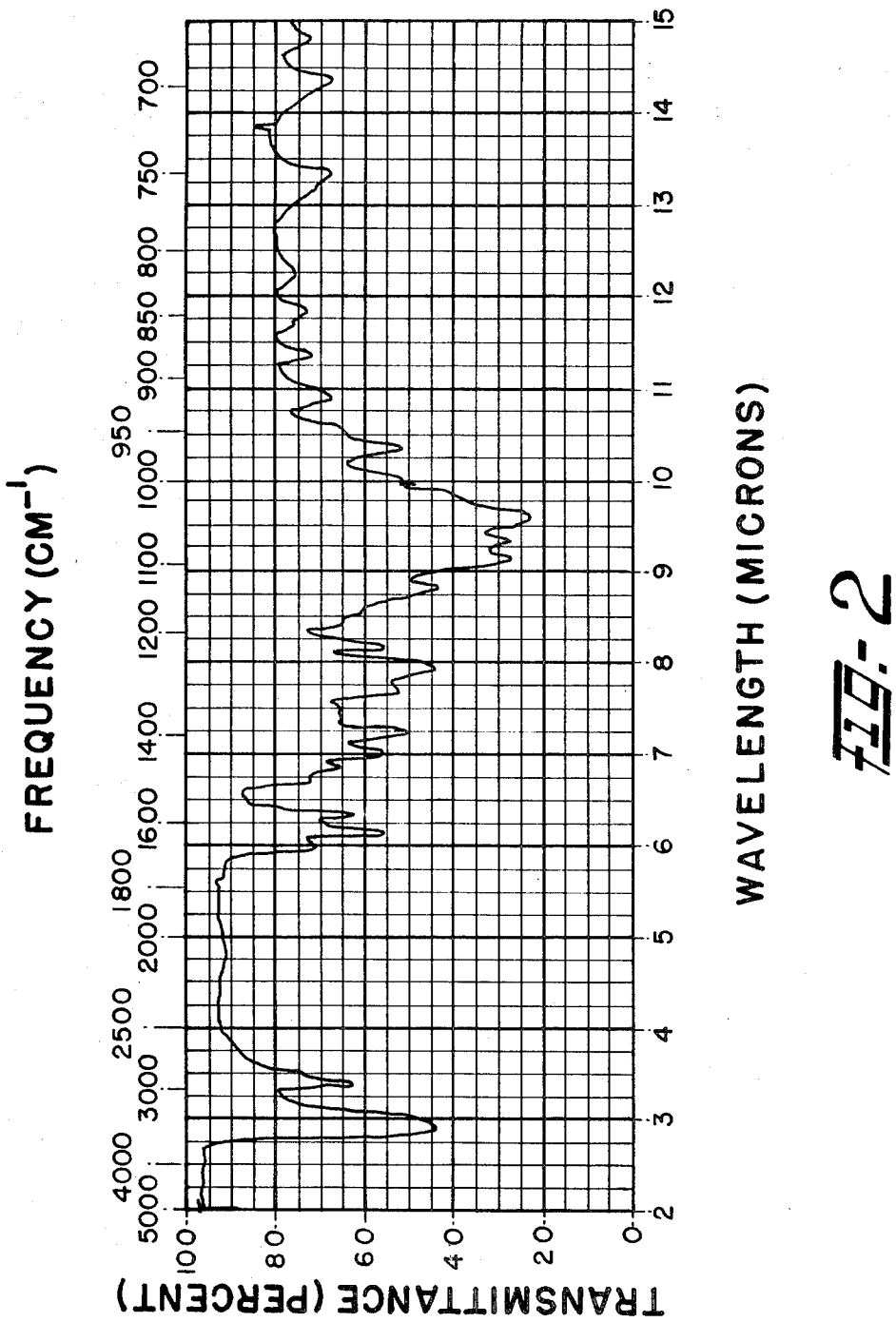

3,592,925
ANTIBIOTICS AH272α₂ AND AH272β₂ AND PROCESS FOR PRODUCING SAME
Ralph Henry Evans, Jr., River Vale, N.J., and Samuel Owen Thomas, Pearl River, N.Y., assignors to American Cyanamid Company, Stamford, Conn.
Filed Apr. 21, 1969, Ser. No. 817,890
Int. Cl. A61k 21/00
U.S. Cl. 424—119       10 Claims

ABSTRACT OF THE DISCLOSURE

This disclosure describes two new antibiotics, designated AH272α₂ and AH272β₂, produced in a microbiological fermentation under controlled conditions using a new strain of Streptomyces platensis and mutants thereof. The new antibiotics are active against gram-positive bacteria and thus are useful in inhibiting the growth of such bacteria wherever they may be found.

BRIEF SUMMARY OF THE INVENTION

This invention relates to two new antibiotics, to their production by fermentation, to methods for their recovery and concentration from crude solutions, to processes for their purification and to the preparation of their salts.

The present invention includes within its scope the antibiotics in dilute forms, as crude concentrations, and in pure crystalline forms. These novel products are active against a variety of microorganisms including gram-positive bacteria. The effects of the new antibiotics on specific microorganisms, together with their chemical and physical properties, differentiate them from previously described antibiotics.

DETAILED DESCRIPTION OF THE INVENTION

The new antibiotics, which we have designated AH272α₂ and AH272β₂, are formed during the cultivation under controlled conditions of a new strain of Streptomyces platensis. This new antibiotic-producing streptomycete was isolated from a soil sample collected in the Philippine Islands. A viable culture of the new microorganism has been deposited with the Culture Collection Laboratory, Northern Utilization Research and Development Division, United States Department of Agriculture, Peoria, Ill. and has been added to its permanent collection. It is freely available to the public in this depository under its accession number NRRL 3593.

The following is a general description of the organism S. platensis, NRRL 3593, based on diagnostic characteristics observed. The underscored descriptive colors and color chip designations are taken from Jacobson et al., "Color Harmony Manual," 3rd ed. (1948), Container Corporation of America, Chicago, Illinois.

Amount of growth

Moderate to good on all media used.

Aerial mycelium and/or en masse spore color

Arealia mycelium white to yellowish white, becoming Silver Gray (3 fe) to Covert Gray (2 fe) in sporulating portions. Sporulation good on most media; light on Czapek's Solution and Asparagine Dextrose Agars. Dark hygroscipic patches on several media.

Soluble pigment

In yellowish shades on most media. Varying from light to heavy depending upon media; most pronounced on Czapek's Solution, Tomato Paste, and Tomato Paste Oatmeal Agars. Colorless to yellowish exudate on several media.

Reverse color

In yellowish to brownish shades on most media.

Miscellaneous physiological reactions

Slight reduction of nitrates to nitrites; complete liquefaction of gelatin in 14 days; no chromogenicity on peptone-iron agar. Carbon source utilization according to Pridham et al., J. Bacteriol. 56: 107–114 (1948) as follow: fair to good utilization of adonital, d-fructose, i-inositol, lactose, d-mannitol, d-melezitose, d-melibiose, d-raffinose, salicin, sucrose, d-trehalose, and dextrose; poor to non-utilization of l-arabinose, dextran, l-rhamnose, and d-xylose.

Micromorphology

Spore chains arising from aerial hyphae as tightly wound coils and spirals. Tending to form clumps of soriferous appendages. Spores elliptical to somewhat crescent-shaped measuring $0.5$–$0.6\mu$ x $0.9$–$1.1\mu$; smooth-walled as determined by electron microscopy.

The combination of grayish spores, tightly spiralled spore chains, hygroscopic patches in the aerial mycellium, and lack of chromogenicity on tyrosine-containing media, indicates that NRRL 3593 is a member of the S. hydroscopicus-like complex described by Tresner and Backus, "A Broadened Concept of the Charcateristics of Streptomyces hydroscopicus" Appl. Microbiol. 4:244–250 (1956). In a more recent study by these authors ["Morphological Spore Types in the Streptomyces hydroscopicus-like Complex" Appl. Microbiol. 15:637–639 (1967)] it was learned that the S. hygroscopicus-like complex could be subdivided according to various physiological measurements, but particularly on the basis of spore morphology. The species S. hydroscopious had short cylindrical spores, whereas S. platensis of that group had elliptical to crescent-shaped spores. The spores of NRRL 3593 corresponded percisely with those of the latter type. When a side by side comparison was made with reference specimens and published descriptions [Waksman, S. A., The Actinomycetes, vol. II, The William & Wilkins Co., Baltimore (1961)] of S. platensis, NRRL 2364, as well as with other members of the complex, it was found that NRRL 3593 also resembled S. platensis most closely in spore color, sporophore morphology, carbon source utilization patterns and in general growth characteristics. The aerial mycelial development of NRRL 3593 was heavier than S. platensis, NRRL 2364, and NRRL 3593 also produced a greater amount of yellowish pigment on most media. These characteristics, however, are found to be variable from strain to strain and are not considered significant enough to affect the relationship. In view of the close correspondence of NRRL 3593 to the species S. platensis in essential diagnostic taxonomic features, it will, hereafter, be considered a variant strain of that species.

Observations of the cultural, physiological and morphological features of the culture were made when it was grown on several diagnostic media, including those recommended by Pridham et al. ["A Selection of Media for Maintenance and Taxonomic Study of Streptomyces," Antibiotics Annual (1956–1957), pp. 947–953]. Detailed observations are recorded in Tables I, II, III, and IV below. Underscored descriptive colors are taken from the "Color Harmony Manual."

TABLE I
[Cultural characteristics of *Streptomyces platensis* NRRL 3593]
Incubation: 14 days
Temperature: 28° C.

| Medium | Amount of growth | Aerial mycelium and/or spores | Soluble pigment | Reverse color | Remarks |
|---|---|---|---|---|---|
| Czapek's solution agar | Moderate | Aerial mycelium white, covered with heavy Sunlight Yellow (1½ ia) exudate. Sporulation grayish; light. | Sunlight Yellow (1½ ia); heavy. | Orange Rust (4 pe). | |
| Asparagine dextrose agar | do | Aerial mycelium yellowish-white, becoming tinged with light grayish sporulation. Sporulation light. | Yellowish; very light. | Colonial Yellow (2 ga). | |
| Tomato paste oatmeal agar | Good | Aerial mycelium whitish, becoming Covert Gray (2 fe) to Silver Gray (3 fe) in sporulation zones. Sporulation good. | Sunlight Yellow (1½ ia); heavy. | Brite Melon Yellow (3 ia). | Moderate colorless to yellowish exudate. |
| Hickey and Tresner's agar | Moderate | Aerial mycelium yellowish-white, becoming Silver Gray (3 fe) in sporulation zones. Sporulation good. | Yellowish; moderate. | Mustard Gold (2 pg). | |
| Yeast extract agar | Good | Aerial mycelium whitish, becoming Silver Gray (3 fe) in sporulation zones. Sporulation good. | Yellowish; very light. | Beaver (3 li). | |
| Oatflake agar | do | do | do | Topaz (3 ne). | Dark hygroscopic patches. |
| Carvajal's oatmeal agar | do | Aerial mycelium whitish, becoming Gray Scale (d) to Silver Gray (3 fe) in sporulation zones. Sporulation good. | do | do | Light colorless exudate; dark hygroscopic patches. |
| Tomato paste agar | do | Aerial mycelium whitish, becoming Silver Gray (3 fe) in sporulation zones. Sporulation good. | Sunlight Yellow (1½ ia); heavy. | Amber (3 pe). | Moderate colorless exudate. |
| Potato dextrose agar | do | Aerial mycelium yellowish-white, becoming Silver Gray (3 fe) in sporulation zones. Sporulation good. | Yellowish; moderate. | do | Moderate colorless exudate; hygroscopic patches. |
| Bennett's agar | do | Aerial myceluim whitish becoming Silver Gray (3 fe) in sporulation zones. Sporulation good. | do | Mustard Gold (2 pg). | Light colorles. exudate. |
| Inorganic salts-starch agar | do | do | None | Biscuit (ec). | Hygroscopic patches; starch hydrolyzed. |

TABLE II
[Micromorphology of *Streptomyces platensis* NRRL 3593]

| Medium | Aerial mycelium and/or sporiferous structures | Spore shape | Spore size | Spore surface |
|---|---|---|---|---|
| Oatflake agar | Spore chains arising from aerial hyphae as tightly wound coils and spirals. tending to form clumps of sporiferous appendages. | Elliptical to somewhat crescent shaped. | $0.5$–$0.6\mu$ x $0.9$–$1.1\mu$ | Smooth as determined electron microscopy. |

TABLE III
[Miscellaneous physiological reaction of *Streptomyces platensis* NRRL 3593]
Temperature: 28° C.

| Medium | Incubation period | Amount of growth | Physiological reaction |
|---|---|---|---|
| Organic nitrate broth. | 7 days | Good | Slight reduction of nitrates to nitrites. |
| Do. | 14 days | do | Do. |
| Gelatin | 7 days | do | No liquefaction. |
| Do. | 14 days | do | Complete liquefaction. |
| Peptone-iron agar | 24 hours | do | No chromogenicity. |

Table IV.—Carbon source utilization pattern of *Streptomyces platensis* NRRL 3593

Incubation: 10 days
Temperature: 28° C.

| Carbon source: | Utilization [1] |
|---|---|
| Adonital | 3 |
| l-arabinose | 1 |
| Dextran | 0 |
| d-Fructose | 3 |
| i-Inositol | 3 |
| Lactose | 3 |
| d-Mannitol | 3 |
| d-Melezitose | 3 |
| d-Melibiose | 3 |
| d-Raffinose | 3 |
| l-Rhamnose | 0 |
| Salicin | 2 |
| Sucrose | 3 |
| d-Trehalose | 3 |
| d-Xylose | 1 |
| Dextrose | 3 |
| Negative control | 0 |

[1] 3—good utilization; 2—fair utilization; 1—poor utilization; 0—no utilization.

It is to be understood that for the production of the new antibiotics the present invention is not limited to this particular organism nor to organisms fully answering the above growth and microscopic characteristics which are given for illustrative purposes. In fact, it is desired and intended to include the use of mutants produced from the described organism by various means such as X-radiation, ultraviolet radiation, nitrogen mustard, phage exposure, and the like.

The fermentation process

Cultivation of the organism *S. platensis* NRRL 3593 may be carried out in a wide variety of liquid culture media. Media which are useful for the production of the novel antibiotics include an assimilable source of carbon such as starch, sugar, molasses, glycerol, etc.; an assimilable source of nitrogen such as protein, protein hydrolysate, polypeptides, amino acids, corn steep liquor, etc.; and inorganic anions and cations, such as potassium, sodium, calcium, sulfate, phosphate, chloride, etc. Trace elements such as boron, molybdenum, copper, etc. are supplied as impurities of other constituents of the media. Aeration in tanks and bottles is provided by forcing sterile air through or onto the surface of the fermenting medium. Further agitation in tanks is provided by a mechanical impeller. An antifoaming agent, such as 1% octadecanol in lard oil, may be added as needed.

Inoculum preparation

Shaker flask inoculum of *S. platensis* NRRL 3593 is prepared by inoculating 100 milliliters of sterile liquid medium in 500 milliliter flasks with scrapings or washings of spores from an agar slant of the culture. The following medium is ordinarily used.

|  | Grams |
|---|---|
| Glucose | 10 |
| Molasses | 20 |
| Beef extract | 10 |

Water to 1000 milliliters.

The flasks are incubated at a temperature of 25°–29° C., preferably 28° C., and agitated vigorously on a rotary shaker for 30 to 48 hours. These 100 milliliter inocula are used to inoculate one liter and twelve liter batches of the same medium in 2-liter and 20-liter glass fermentors. The inoculum mash is aerated with sterile air while growth is continued for 30 to 48 hours. These batches of inocula are used to inoculate tank fermentors.

Tank fermentation

For the production of the antibiotics in tank fermentors, the following fermentation medium is preferably used.

|  | Grams |
|---|---|
| Corn startch | 30 |
| Molasses | 20 |
| Soy bean meal | 15 |
| Calcium carbonate | 10 |

Water to 1000 milliliters.

Each tank is inoculated with approximately 3% of the inoculum prepared as described above. Aeration is supplied at the rate of 0.5–1.0 liter of sterile air per liter of broth per minute. The fermenting mixture is agitated by an impeller driven at 300–800 r.p.m. and the temperature is maintained at 25°–29° C., usually at 28° C. The fermentation is ordinarily continued for 100 to 120 hours at which time the mash is harvested.

Isolation and purification procedure

After the fermentation is completed, the fermented mash containing the antibiotics of this invention is filtered to remove the mycelium. Diatomaceous earth or any other conventional filtration aid may be used to assist in the filtration. Normally, the mycelial cake is washed with a small amount of water and the wash is pooled with the filtrate. Thereafter, the antibiotics may be recovered from the pooled filtrate using conventional techniques such as the following.

The pooled filtrate is adjusted to about pH 9 with any suitable base such as potassium hydroxide, sodium hydroxide or ammonium hydroxide but ammonium hydroxide is used preferably. The antibiotics may be extracted from the adjusted solution with a water immiscible solvent such as methylene chloride or chloroform using a volume of about one-half of the volume of the pooled filtrate. Chloroform is the preferred extraction solvent. The extract is concentrated under reduced pressure ordinarily to about 4 to 5 percent of the original volume of the solvent. The concentrate is charged onto a column of silica gel and the antibiotics are retained by the gel which is subsequently washed with a one to one mixture of methylene chloride and acetone. The antibiotics may be eluted from the column by means of a linear gradient between a mixture of one to one methylene chloride-acetone and acetone. Ordinarily, the effluent is monitored by optical density readings at 420m$\mu$ and three components, designated AH272$\alpha$, AH272$\beta$, and AH272$\gamma$ may be separated and obtained in dry form by evaporation of the solvent. Optical density peaks indicate maximum concentration of a particular component. Both the $\alpha$ and the $\beta$ components may be further separated by column partition chromatography into $\alpha_2$ and $\beta_2$ respectively.

Physical characteristics

Infrared absorption spectra of AH272$\alpha_2$ and AH272$\beta_2$ as free bases in KBr pellets are prepared in a standard manner. The $\alpha_2$ component exhibits absorption maxima in the infrared spectrum at the following wavelengths expressed in microns: 2.95, 6.00, 6.15, 6.34, 6.48, 7.03, 7.26, 7.75, 7.97, 8.20, 9.3 (broad), 10.4 and 13.34. The infrared curve of AH272$\alpha_2$ is shown in FIG. 1 of the accompanying drawings. The $\beta_2$ component exhibits absorption maxima in the infrared spectrum at the following wavelengths expressed in microns: 2.95, 6.00, 6.14, 6.32, 7.03, 7.25, 7.71, 7.96, 8.18, 9.14–9.31–9.6 (broad triplet), 10.36 and 13.32. The infrared curve of AH272$\beta_2$ is shown in FIG. 2 of the accompanying drawings.

The antibiotics are composed of the elements carbon, hydrogen, nitrogen and oxygen in substantially the following average percentages by weight:

|  | AH272$\alpha_2$ | AH272$\beta_2$ |
|---|---|---|
| Carbon | 55.41 | 57.85 |
| Hydrogen | 7.04 | 7.67 |
| Nitrogen | 2.34 | 2.83 |
| Oxygen | 31.22 | 29.70 |

The following are physical characteristics of AH272$\alpha_2$:

Melting point: 244° C. (decomposes)

$[\alpha]_D^{25°}$: +223° (CHCl$_3$)

Ultraviolet maxima occur at:

229 m$\mu$ ($E_{1\,cm.}^{1\%}$=460)

262 m$\mu$ ($E_{1\,cm.}^{1\%}$=285)

418 m$\mu$ ($E_{1\,cm.}^{1\%}$=130) in methanol

Listed below are physical characteristics of AH272$\beta_2$:

Melting point: 256°–257° C. (decomposes)

$[\alpha]_D^{25°}$: +202° (CHCl$_3$)

Ultraviolet maxima occur at:

231 m$\mu$ ($E_{1\,cm.}^{1\%}$=380)

265 m$\mu$ ($E_{1\,cm.}^{1\%}$=238)

418 m$\mu$ ($E_{1\,cm.}^{1\%}$=105) in methanol

Both components, AH272$\alpha_2$ and AH272$\beta_2$, are clearly distinguished from other antibiotics by the foregoing characterization data and by their antimicrobial activity.

The novel compounds of the present invention form non-toxic acid-addition salts with a variety of organic and inorganic salt-forming reagents. Thus, acid-addition salts, formed by admixture of the organic free base with an acid, suitably in a neutral solvent, are formed with such acids as sulfuric, phosphoric, hydrochloric, hydrobromic, sulfamic, citric, lactic, malic, succinic, tartaric, acetic, benzoic, gluconic, ascorbic, and related acids. For purposes of this invention, the antibiotic free bases are equivalent to their non-toxic acid-addition salts.

The novel compounds of the present invention are useful as antibacterial agents and possess broad-spectrum antibacterial activity in vitro against a variety of standard laboratory microorganisms as determined by the agar-dilution streak-plate technique. In this assay, the compounds to be tested are made up to contain 2.5 mg. of test compound per milliliter of solution. Observing sterile techniques, two-fold serial dilutions are made of each test solution. One milliliter of each of the original solutions and of each of the serial dilutions is then added to 9 ml. of warm sterile nutrient agar capable of supporting growth of the bacterial test cultures. The standard sterile nutrient agar solutions containing the different dilutions of the test compounds, along with suitable and comparable control dilutions containing no test compound, are then allowed to cool in Petri dishes thereby forming solidified agar plates. The test bacteria are prepared for use by growing in broth overnight. A loopful of each of the resulting live suspensions is then, still employing sterile techniques, streaked upon the surfaces of each of the agar plates and the resulting streaked plates are then incubated. After an appropriate period of time, each of the streaks on each of the plates is inspected visually and the extent, if any, of bacterial growth is noted. The minimal inhibitory concentration (expressed in micrograms per milliliter) is defined as the concentration of test compound causing complete inhibition of growth of any particular organism.

In a representative operation, the minimal inhibitory concentration of the compounds of this invention against standard laboratory microorganisms and against hospital isolate strains of *Staphylococci* and *Streptococci*, as determined in the above-described assay, are set forth in Tables V and VI below:

TABLE V

[In vitro activity against standard laboratory microorganisms]

| Organism | Minimal inhibitory conc. (mcg./ml.) | |
|---|---|---|
| | AH272$\alpha_2$ | AH272$\beta_2$ |
| *Mycobacterium smegmatis* ATCC 607 | 62 | 125 |
| *Staphylococcus aureus* ATCC 6538P | 15 | 15 |
| *Streptococcus faecalis* ATCC 8043 | 15 | 31 |
| *Bacillus subtilis* ATCC 6633 | 8 | 15 |
| *Pseudomonas aeruginosa* ATCC 10145 | >250 | >250 |
| *Proteus vulgaris* ATCC 9484 | >250 | >250 |
| *Escherichia coli* ATCC 9637 | >250 | >250 |
| *Salmonella gallinarum* Led. An. Ind. 604 | >250 | 250 |

TABLE VI

[In vitro activity against hospital isolate strains]

| Organism | Minimal inhibitory conc. (mcg./ml.) | |
|---|---|---|
| | AH272$\alpha_2$ | AH272$\beta_2$ |
| *Streptococcus pyogenes* "Group A" C-203 | 2 | 2 |
| *Streptococcus* sp. $\gamma$-strep. 11 | 31 | 31 |
| *Streptococcus* sp. $\beta$-strep. 80 | 31 | 31 |
| *Streptococcus pyogenes* NY-5 | 2 | 2 |
| *Streptococcus pyogenes* No. 197 | 4 | 2 |
| *Streptococcus pyogenes* No. 158 | 62 | 250 |
| *Streptococcus pyogenes* No. 154 | 2 | 4 |
| *Sarcina lutea* ATCC 9341 | 8 | 15 |
| *Staphylococcus aureus* No. 3 (4050B-122) | 8 | 15 |
| *Staphylococcus aureus* No. 7 (4050B-122) | 62 | 62 |
| *Staphylococcus aureus* No. 9 (4050B-122) | 15 | 15 |
| *Staphylococcus aureus* No. 10 (4050B-122) | 31 | 15 |
| *Staphylococcus aureus* No. 11 (4050B-122) | 8 | 15 |
| *Staphylococcus aureus* No. 13 (4050B-122) | 15 | 62 |
| *Staphylococcus aureus* No. 14 (4050B-122) | 15 | 15 |
| *Staphylococcus aureus* Rose | 15 | 15 |
| *Staphylococcus aureus* Smith | 8 | 15 |
| *Staphylococcus aureus* 69 | 8 | 15 |

The high in vitro antibacterial activity of the novel compounds of the present invention makes them useful alone, or in combination with other antibacterial agents, to prevent the growth of, or reduce the number of, gram-positive microorganisms present in various environments. They are thus useful as oil preservatives, for example, as a bacteriostatic agent for inhibiting the growth of microorganisms known to cause spoilage in fuel oils and cutting oils. They are also useful in soaps, shampoos and topical compositions for the treatment of wounds and burns. Also, they are useful in wash solutions for sanitation purposes, as in the washing of hands and the cleaning of equipment, floors, or furnishings of contaminated rooms or laboratories. They are also useful as an industrial preservative, for example, as a bacteriostatic rinse for laundered clothes and for impregnating paper and fabrics; and they are useful for suppressing the growth of sensitive organisms in plate assays and other biological media.

The usefulness of these new antibiotics is further demonstrated by their ability to control systemic lethal infections in mice. Both show in vivo antibacterial activity in mice against *Staphylococcus aureus*, strain Smith, and *Streptococcus pyogenes*, C–203, when administered by a single dose to groups of Carworth Farms CF–1 female mice, weight about 20 grams, infected intraperitoneally with a lethal dose of these bacteria in $10^{-2}$ and $10^{-5}$ trypticase soy broth (TSP) dilutions, respectively, of a five-hour TSP blood culture. Although the new antibiotics have not as yet been demonstrated to be clinically useful in human therapy, the conditions of the tests in mice against human pathogens indicate a high probability of useful activity in humans. Table VII below sets forth the in vivo antibacterial activity of AH272$\alpha_2$ and AH272$\beta_2$.

TABLE VII

[In vivo antibacterial activity of AH272$\alpha_2$, AH272$\beta_2$]

| Single dose, mg./kg. | *Staphylococcus aureus*, Smith strain, 6 days post infection (alive/total) | | | *Streptococcus pyogenes*, C–203, 6 days post infection (alive/total) | | |
|---|---|---|---|---|---|---|
| | Subcutaneous dose | | Oral dose AH272$\beta_2$ | Subcutaneous dose | | Oral dose AH272$\beta$ |
| | AH 272$\alpha_2$ | AH272$\beta_2$ | | AH272$\alpha_2$ | AH272$\beta_2$ | |
| 640 | | | | | | 0/5 |
| 320 | | | | | | 0/5 |
| 160 | | | 0/5 | | | 0/5 |
| 80 | | | T2/10 | 0/5 | | T6/10 | 0/5 |
| 40 | T2/10 | | 4/5 | | T0/10 | 4/5 |
| 20 | T1/10 | | 5/5 | | T1/10 | 4/5 |
| 10 | 3/10 | | 3/5 | | St 0/10 | 0/5 |
| 5 | 0/5 | | 1/5 | | | 0/5 |

NOTES:
T=Toxic. St=Survival time prolonged.
Infected non-treated control mice:
*Staphylococcus aureus*, Smith: 58/60 mice died within one day.
*Streptococcus pyogenes* C–203: 40/40 mice died within one day.

The invention will be described in greater detail in conjunction with the following specific examples.

EXAMPLE 1

Inoculum preparation

A typical medium used to grow primary inoculum is as follows:

| | Grams |
|---|---|
| Glucose | 10 |
| Molasses | 20 |
| Beef extract | 10 |

Water to 1000 milliliters.

Washed or scraped spores from an agar slant of *S. platensis* NRRL 3593 are used to inoculate two 100 milliliter portions of the above medium contained in two 500-milliliter flasks. The flasks are placed on a rotary shaker and agitated vigorously for a period of 48 hours at 28° C. The resulting flask inoculum is then transferred to a 5- gallon glass fermentor containing 12 liters of the above medium. The glass fermentor is aerated with sterile air while growth is carried out for about 48 hours, after which time the contents are used to seed a 300-liter tank fermentor.

EXAMPLE 2

Tank fermentation

A fermentation medium is prepared according to the following formula:

|   | Grams |
|---|---|
| Corn starch | 30 |
| Molasses | 20 |
| Soy bean meal | 15 |
| Calcium carbonate | 10 |

Water to 1000 milliliters.

The fermentation medium is sterilized at 120° C. with steam at 15 pounds pressure for 45–60 minutes. The pH of the medium after sterilization is about 6.7. Sterile medium, 300 liters, in a 400-liter tank fermentor is inoculated with 12 liters of inoculum, prepared as described in Example 1. The fermentation is carried out at 28° C. using Hodag LG-8 oil as a defoaming agent. Aeration is supplied at the rate of 0.5 liter of sterile air per liter of mash per minute. The mash is agitated by an impeller driven at about 300 revolutions per minute. After aproximately 114 hours of fermentation time, the mash is harvested.

EXAMPLE 3

Isolation

To 280 liters of the fermented mash obtained as described in Example 2 is added diatomaceous earth in the proportion of about 3% weight per volume. The broth is filtered at the existing pH (about pH 7.0–7.7), the filter cake is washed with water and the pad is discarded. The wash water and filtrate are pooled and the resultant solution (total volume 280 liters) is adjusted to about pH 9 with ammonium hydroxide and extracted with 140 liters of chloroform. The spent aqueous phase is dicarded. The chloroform extract is concentrated under reduced pressure to a volume of about 6 liters and is charged onto a silica gel column (about 1800 grams silica gel, 3-inch diameter). One liter of a one to one mixture of methylene chloride and acetone is used as a wash. The column is developed with 50 liters of a linear gradient between methylene chloride-acetone (1:1) and acetone (mixing chamber, 12 liters), followed with 14 liters of acetone. The effluent is monitored with optical density readings at 420 m$\mu$ and collected in separate 800 ml. portions. The $\alpha$ and $\beta$ components are readily defined and may be located by the optical density readings: the first maximum reading indicating the peak of the $\alpha$ component and the second maximum reading indicating the peak of the $\beta$ component. Fractions 11 through 22, which contain the $\alpha$ component, are combined and the solvent is removed by evaporation under reduced pressure. Crystalline AH272$\alpha$ (6.05 g.) is obtained from this concentrate by inducing crystallization. Fractions 26 through 44, which contain the $\beta$ component, are combined also and the solvent is likewise removed by evaporation under reduced pressure. Crystalline AH272$\beta$ is formed when a major portion of the solvent is removed and may be obtained by filtration (10.68 g.). Further removal of the solvent yields an additional crop of crystalline AH272$\beta$ (about 4.8 g.). A third component, the $\gamma$ component, optionally may be obtained by a final elution of the column with methanol, about 5 liters being needed. Recovery of the component in a solid state may be effected by evaporation of the solvent under reduced pressure.

The $\alpha$ component, AH272$\alpha$, may be further purified by means of partition chromatography on Celite®. The column support is prepared by mixing 0.5 ml. of the equiliberated aqueous or upper phase of the system composed of 5 parts chloroform and 2 parts 0.8 M acetic acid-sodium acetate buffer (pH 3.5) for each 1 g. of Celite®. The mixed ingredients are packed into a glass column 3 inches inside diameter. The sample, 5.9 g. of crude crystals, is dissolved in a small amount of the upper and lower phase and Celite® added in the quantity of 2 g. per 1 ml. of aqueous phase. The charge is packed on top of the column which is then developed with the lower (solvent) phase. The major antibiotic activity is located at 10 hold-back-volumes and is extracted with 0.1 N hydrochloric acid. The acid extract is back-extracted three times after neutralization (pH 7.5), with one-third volumes of methylene chloride. The antibiotic is crystallized by replacement of the methylene chloride with acetone during concentration to yield 1.0 g. of pure AH272$\alpha_2$. A microanalytical sample is dried in vacuo for three hours at 77° C.

The $\beta$ component, AH272$\beta$, likewise may be further purified by means of partition chromatography on Celite®. In this procedure the eluate fraction from the silica gel column corresponding to the $\beta$ component is concentrated to a small volume and after being left to stand overnight the crude crystals are separated. One gram of these crystals is further purified by partition chromatography as previously described, on a 550 g. Celite® column using the solvent phase of the system 2 parts chloroform and 1 part 1 M acetic acid-sodium acetate buffer (pH 6.3) for development. The column eluate containing the major $\beta_2$ component is extracted with 0.1 M hydrochloric acid. The acid extract is neutralized (pH 7.5–8.0) and back-extracted 3 times with one-third volumes of methylene chloride. Replacement of the methylene chloride with acetone during concentration induces crystallization and affords 0.51 g. of crystalline AH272$\beta_2$. A microanalytical sample is dried in vacuo for three hours at 77° C.

EXAMPLE 4

Preparation of the hydrochloride salt of AH272$\beta_2$

One gram of AH272$\beta_2$ is dissolved in anhydrous chloroform and hydrogen chloride gas is bubbled through the solution. A precipitate is formed and the bubbling is continued until no additional solid precipitates. The solid is removed by filtration and air dried and subsequently dissolved in water, filtered, and lyophilized. A microanalytical sample is dried in vacuo for 3 hours at 77° C., M.P. 233–239° C. (decomp.). The hydrochloride salt of AH272$\beta_2$ prepared in this manner is composed of the elements carbon, hydrogen, nitrogen, oxygen and chlorine in substantially the following average percentages by weight:

| Carbon | 53.67 |
|---|---|
| Hydrogen | 7.52 |
| Nitrogen | 2.50 |
| Oxygen | 30.31 |
| Chlorine | 6.46 |

The hydrochloride salt of AH272$\beta_2$ exhibits absorption maxima in the infrared spectrum at the following wavelengths expressed in microns: 2.95, 6.00, 6.16, 6.35, 7.03, 7.28, 7.73, 8.00, 8.20, 8.80, 9.13–9.32–9.65 (broad triplet), 10.36, and 13.30. Ultraviolet maxima occur at:

$$230 \text{ m}\mu \ (E^{1\%}_{1\text{cm.}}=330)$$

$$262 \text{ m}\mu \ (E^{1\%}_{1\text{cm.}}=220)$$

$$420 \text{ m}\mu \ (E^{1\%}_{1\text{cm.}}=93) \text{ in methanol}$$

EXAMPLE 5

Preparation of the sulfate salt of AH272$\beta_2$

One gram of AH272$\beta_2$ is dissolved in a mixture of 100 ml. absolute ethanol and 40 ml. of chloroform. A solution of 0.184 g. of concentrated sulfuric acid in 0.9 ml. of ethanol is added slowly to the solution. The reaction mixture is then concentrated in vacuo to a small volume and the solids are removed by filtration and washed with ether. The solids are then dissolved in hot ethanol, filtered and 504 mg. of crystals are recovered upon cooling and concentration of the filtrate. On recrystallization, 300 mg.

of the sulfate salt are obtained. A microanalytical sample is dried in vacuo for three hours at 77° C., M.P. 206.5 to 208.5° C. The sulfate salt of AH272$\beta_2$ prepared in this manner contains the elements carbon, hydrogen, nitrogen, oxygen and sulfur in substantially the following average percentages by weight:

Carbon .................................... 50.29
Hydrogen .................................. 7.02
Nitrogen .................................. 2.08
Oxygen .................................... 34.21
Sulfur .................................... 4.47

The sulfate salt of AH272$\beta_2$ exhibits absorption maxima in the infrared spectrum at the following wavelengths expressed in microns: 2.94, 6.00, 6.13, 6.30, 7.03, 7.25, 8.00, 8.20, 9.15–9.40 (broad doublet), 10.36, 10.95 and 13.37. Ultraviolet maxima occur at:

$$230 \text{ m}\mu \ (E_{1\text{ cm.}}^{1\%}=300)$$

$$263 \text{ m}\mu \ (E_{1\text{ cm.}}^{1\%}=190)$$

$$418 \text{ m}\mu \ (E_{1\text{ cm.}}^{1\%}=88) \text{ in methanol}$$

What is claimed is:

1. Antibiotic AH272$\alpha_2$, a compound which
   (a) is effective in inhibiting the growth of gram-positive bacteria; and in its essentially pure crystalline form
   (b) has a melting point of 244° C. (dec.);
   (c) has an optical rotation $[\alpha]_D^{25°} = +223°$ in chloroform;
   (d) has the following elemental analysis (percent): C, 55.41; H, 7.04; O, 31.22; N, 2.34;
   (e) has ultraviolet absorption maxima at:

229 m$\mu$ ($E_{1\text{ cm.}}^{1\%}=460$), 262 m$\mu$ ($E_{1\text{ cm.}}^{1\%}=285$), 418 m$\mu$ ($E_{1\text{ cm.}}^{1\%}=130$) in methanol; and (f) has a characteristic infrared absorption spectrum as shown in FIG. 1 of the accompanying drawings.

2. A compound as defined in claim 1, antibiotic AH272$\alpha_2$, in its essentially pure form.

3. A compound selected from the group consisting of antibiotic AH272$\alpha_2$, according to claim 1, and acid-addition salts thereof.

4. Antibiotic AH272$\beta_2$, a compound which
   (a) is effective in inhibiting the growth of gram-positive bacteria; and in its essentially pure crystalline form
   (b) has a melting point of 256°–257° C. (dec.);
   (c) has an optical rotation $[\alpha]_D^{25} = +202°$ in chloroform;
   (d) has the following elemental analysis (percent): C, 57.85; H, 7.67; O, 29.70; N, 2.83;
   (e) has ultraviolet absorption maxima at:

231 m$\mu$ ($E_{1\text{ cm.}}^{1\%}=380$), 265 m$\mu$ ($E_{1\text{ cm.}}^{1\%}=238$), 418 m$\mu$ ($E_{1\text{ cm.}}^{1\%}=105$) in methanol; and (f) has a characteristic infrared absorption spectrum as shown in FIG. 2 of the accompanying drawings.

5. A compound as defined in claim 4, antibiotic AH272$\beta_2$, in its essentially pure form.

6. A compound selected from the group consisting of antibiotic AH272$\beta_2$, according to claim 4, and acid-addition salts thereof.

7. A process for the production of antibiotic AH272$\alpha_2$ which comprises cultivating *Streptomyces platensis* NRRL 3593 in an aqueous nutrient medium containing assimilable sources of carbohydrate, nitrogen and inorganic salts under submerged aerobic conditions until substantial antibacterial activity is imparted to said medium by the production of antibiotic AH272$\alpha_2$, as defined in claim 1, and then recovering antibiotic AH272$a_2$ therefrom.

8. A process for the production of antibiotic AH272$a_2$, which comprises cultivating *Streptomyces platensis* NRRL 3593 in an aqueous nutrient medium containing assimilable sources of carbohydrate, nitrogen and inorganic salts under submerged aerobic conditions for a period of from 100 to 120 hours and at a temperature of from 25° C. to 29° C. until substantial antibacterial activity is imparted to said medium by the production of antibiotic AH272$\alpha_2$, as defined in claim 1, and then recovering antibiotic AH272$\alpha_2$ therefrom.

9. A process for the production of antibiotic AH272$\beta_2$ which comprises cultivating *Streptomyces platensis* NRRL 3593 in an aqueous nutrient medium containing assimilable sources of carbohydrate, nitrogen and inorganic salts under submerged aerobic conditions until substantial antibacterial activity is imparted to said medium by the production of antibiotic AH272$\beta_2$, as defined in claim 4, and then recovering antibiotic AH272$\beta_2$ therefrom.

10. A process for the production of antibiotic AH272$\beta_2$ which comprises cultivating *Streptomyces platensis* NRRL 3593 in an aqueous nutrient medium containing assimilable sources of carbohydrate, nitrogen and inorganic salts under submerged aerobic conditions for a period of from 100 to 120 hours and at a temperature of from 25° C. to 29° C. until substantial antibacterial activity is imparted to said medium by the production of antibiotic AH272$\beta_2$, as defined in claim 4, and then recovering antibiotic AH272$\beta_2$ therefrom.

References Cited

Miller, The Pfizer Handbook of Microbial Metabolites, McGraw-Hill Book Co., Inc., New York, 1961, pp. 128 and 580.

JEROME D. GOLDBERG, Primary Examiner

U.S. Cl. X.R.

424—117; 195—80